PROCESS FOR MAKING ORGANOPOLY-SILOXANES

Ben A. Bluestein, Schenectady, N.Y., assignor to General Electric Company, a corporation of New York
No Drawing. Filed Dec. 24, 1962, Ser. No. 246,669
9 Claims. (Cl. 260—46.5)

The present invention relates to an improved method for making a variety of organopolysiloxane polymers and copolymers. More particularly, the present invention relates to equilibrating cyclopolydiorganosiloxanes, carboxyalkylpolysiloxanes and mixtures thereof with certain phosphorous-containing catalysts to provide for the production of a variety of organopolysiloxane polymers and copolymers.

Various methods are known for making organopolysiloxanes having chemically combined diorganosiloxy units such as various fluids and polymers convertible to the cured, solid, elastic state. For example, one method of building up the molecular weight of organopolysiloxanes is by intercondensation with various catalysts such as ferric chloride, or organosiloxy units resulting from the hydrolysis or cohydrolysis of diorganodihalosilanes or mixtures thereof. Although the use of such intercondensation catalysts provides for the production of a number of valuable fluids and gums, the intercondensation method of making organopolysiloxanes polymers does not provide for the advantageous results achieved by true catalytic equilibration. Catalytic equilibration provides for both rearrangement and intercondensation of siloxy units during the formation of the polymer, and is particularly effective in making organopolysiloxane polymers from low molecular weight cyclopolydiorganosiloxanes, or mixtures of such cyclics with various organopolysiloxane hydrolyzate including chain-stopping units such as hexamethyldisiloxane. The results achieved by employing low molecular weight cyclopolydiorganosiloxanes in the production of organopolysiloxane gums and fluids are particularly advantageous because these cyclics can be produced readily in a substantially pure form by distillation.

Although many advantages can be achieved by the method of catalytic equilibration as taught on page 80 of Rochow, Chemistry of the Silicones, Second Edition, John Wiley and Sons, 1951, few readily available chemicals can be employed as equilibration catalysts. Except for such chemicals as potassium hydroxide and sulphuric acid, few materials can be used to satisfactorily equilibrate low molecular weight cyclic polysiloxanes, or organopolysiloxane mixtures containing such cyclics or chain-stopping units with various organopolysiloxane hydrolyzates. Potassium hydroxide, moreover is unsuitable for equilibrating low molecular weight cyclopolysiloxanes, such as octamethylcyclotetrasiloxane or chain-stopping units with organopolysiloxane materials containing carboxyalkyl radicals to provide for the production of copolymers having chemically combined diorganosiloxy units which include siloxy units having carboxyalkyl radicals attached to silicon. In addition, even though the use of potassium hydroxide or sulphuric acid can provide for the production of wide variety of valuable fluids and gums from low molecular weight cyclopolysiloxanes, these catalysts have to be completely removed from the polymers before they are put into service. Substantial depolymerization of the polymer can result, for example, even if only trace amounts of these equilibration catalysts are retained by the polymer when it is exposed to elevated temperatures. Although a variety of methods are available for decatalyzing organopolysiloxane polymers, such as extensive washing and neutralization procedures, and methods utilizing various chemicals such as taught in Boot Patent 3,057,821, Grubb Patent 2,789,109, etc., assigned to the same assignee as the present invention, all of these methods require considerable time and expense. The over-all manufacturing of organopolysiloxane polymers employing sulphuric acid or potassium hydroxide as catalysts accordingly are rendered economically less attractive.

The present invention is based on the discovery that certain catalysts, formed by the reaction between a particular phosphorous halogen compound, such as phosphorousoxychloride, and a particular hydroxy containing material such as tert.-butyl alcohol, can be employed to convert low molecular weight cyclopolydiorganosiloxanes and mixtures thereof to a variety of organopolysiloxane polymers and copolymers. This result is quite surprising since other phosphorous halogen catalysts of the type shown in Sprung Patent 2,472,629, for example, phenoxy phosphoryl dichloride or phenyl phosphonyl dichloride have been found to be ineffective for equilibrating such low molecular weight cyclic polysiloxanes. In addition, the organopolysiloxane polymers produced in accordance with the present invention can be put directly into high temperature service without any need for removing the catalyst from the polymer by additional chemical treatment.

In accordance with the present invention there is provided a process for making a polymer having the formula, (1) 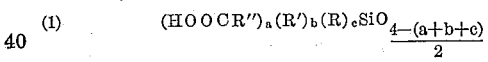

which comprises equilibrating a mixture comprising an organopolysiloxane, and 0.01% to 10% by weight thereof of an equilibration catalyst, where said organopolysiloxane is a member selected from (a) An organosiloxane hydrolyzate consisting of components having chemically combined structural units included by the formula, (2) 

(b) A carboxyalkyl hydrolyzate consisting of components having chemically combined structural units included by the formula, (3) 

and (c) A mixture of said organosiloxane hydrolyzate and said carboxyalkyl hydrolyzate, and where said equilibration catalyst is in the form of the product of reaction at a temperature in the range of from −10° C. to 100° C., of 0.1 to 400 parts of a hydroxy containing material, per part of a phosphorous halogen compound selected from phosphorous pentahalides and phosphorousoxyhalides, where said hydroxy containing material is selected from secondary aliphatic alcohols, tertiary aliphatic alcohols, oxy acids of phosphorous, oxy acids of phosphorous-substituted with monovalent hydrocarbon radicals attached to phosphorous by carbon phosphorous linkages, and aliphatic carboxylic acids, and where $a$ is equal to from 0 to 1, inclusive, $b$ is equal to from 0 to 2, inclusive, $c$ is equal to from 0 to 3, inclusive, and the sum of $a$, $b$ and $c$ is equal to from 1.5 to 3, inclusive, $d$ is an integer equal to from 1 to 3, inclusive, $e$ is an integer equal to from 1 to 2, inclusive, R is a member selected from monovalent hydrocarbon radicals, halogenated monovalent hydrocarbon radicals, and cyanoalkyl radicals, and R' is a member selected from monovalent hydrocarbon radicals and halogenated monovalent hydrocarbon radicals, and R" is an alkylene radical.

Radicals included by R of Formula 1 are aryl radicals, and halogenated aryl radicals such as phenyl, chlorophenyl, xylyl, tolyl, etc.; aralkyl radicals such as phenylethyl, benzyl, etc.; aliphatic, haloaliphatic and cycloaliphatic, such as alkyl, alkenyl, cycloalkyl, haloalkyl, including methyl, ethyl, propyl, chlorobutyl, cyclohexyl, etc.; cyanoalkyl radicals such as cyanoethyl, cyanopropyl, cyanobutyl, etc. Radicals included by R' of Formula 1 are all of the radicals included by R above except cyanoalkyl radicals, and radicals included by R" are alkylene radicals such as ethylene, trimethylene, tetramethylene, octamethylene, etc., R, R', and R" can be all the same radical respectively, or any two or more of the aforementioned, R, R' and R" radicals; R and R' are preferably methyl, and R" is preferably ethylene.

The phosphorous halogen compounds utilized in the practice of the invention to form the equilibration catalyst are phosphorous pentahalides such as phosphorous pentachloride and phosphorous pentabromide and phosphorous oxygen halides such as phosphorous oxytrichloride and phosphorous oxytribromide.

The hydroxy containing materials which can be employed to form the equilibration catalyst of the present invention includes secondary aliphatic alcohols having from 2 to 12 carbon atoms, such as isopropyl alcohol, sec. butyl alcohol, sec. amyl alcohol, 3-pentanol, sec.-n-octyl alcohol, etc. and tertiary aliphatic alcohols, having from 4 to 12 carbon atoms, such as tertiary butyl alcohol, tertiary amyl alcohol, etc. In addition various phosphorous oxy acids and derivatives thereof can be employed such as ortho-phosphoric acid, metaphosphoric acid, pyrophosphoric acid, phosphorous acid and phosphonic acids, and phosphonous acids, such as methyl phosphonic acid, ethyl phosphonic acid, butyl phosphonic acid, phenyl phosphonic acid, methyl phosphonous acid, phenyl phosphonous acid, etc. Also included are aliphatic mono and dicarboxylic acids having from 1 to 12 carbon atoms, such as formic acid, acetic acid, propionic acid, butanoic acid, octanoic acid, decanoic acid, malonic acid, succinic acid, etc.

The polymers of Formula 1 include a variety of products such as fluids and gums having viscosities ranging from 10 centipoises or less, to as high as $10^8$ centipoises or more. For example, fluids can vary between about 1 to about $10^5$ centipoises at 25° C., while gums can vary between $10^5$ to $10^8$ or higher. These materials can be employed in conventional applications in which organopolysiloxanes are utilized and possess all of the outstanding advantages generally attributed to organopolysiloxane polymers. For example, the gums made in accordance with the present invention can be employed to make elastomers having superior resistance to heat-age. The fluids can be utilized in lubricating and hydraulic applications and possess valuable high temperature properties.

Some of the polymers can be made by the equilibration of the organosiloxane hydrolyzate shown in Formula 2 which can be composed of up to 100 percent by weight of a cyclopolydiorganosiloxane having the formula, (4)

where R is as defined above and $n$ is an integer equal to from 3 to 10, inclusive. The organosiloxane hydrolyzate of formula (2) can be obtained by hydrolyzing chlorosilanes included by the formula, (5) $\qquad (R)_d Si(X)_{4-d}$ where R, $d$ and X are as defined above. In addition, copolymers of units shown by Formulae 2 and 3 can be made by equilibrating mixtures of the cyclics of Formula 4 with or without hydrolyzates composed of units of Formula 2, and with hydrolyzates composed of carboxyalkylsiloxy units of Formula 3 to provide for the production of carboxyalkyl copolymers where $a$ in Formula 1 is equal to .001 to 1, and preferably .001 to 0.1, inclusive, $b$ is equal to from 0 to 2, inclusive, $c$ is equal to from 0 to 2.5, inclusive, and the sum of $a$, $b$ and $c$ is equal to 1.5 to 3, and preferably 1.9 to 2.01, inclusive. Hydrolyzates having units shown by Formula 3 can be formed by the method of Bluestein, Patent 2,900,363, involving the hydrolysis in hydrochloric acid of the cyanoalkyl chlorosilane, included by Formula 5 and more particularly by the following formula, (6)

where R, R", $e$ and X are as defined above.

The polymers of Formula 1 also include fluids and gums that are made by the equilibration of hydrolyzate of units of Formula 2 or Formula 3, or mixtures thereof, free of the cyclics of Formula 4 but which contain hydrolyzate of the formula, (7)

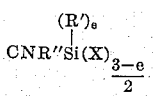

where R''', can be R or R', or a mixture thereof and Z can be HOOCR", R, or R'.

In the preparation of the equilibration catalyst the phosphorous halogen compound and the hydroxy containing material are mixed together and reacted. The catalyst can be formed in situ by adding either component of the catalyst separately to the organopolysiloxane or it can be utilized as a premix. Organic solvents substantially inert to the components of the equilibration mixture can be used in conjunction with the hydroxy containing material and phosphorous halogen material to facilitate the equilibration of the organopolysiloxane. Organic solvents that can be employed for example, are hydrocarbon solvents such as benzene, xylene, toluene, ligroin, acetone, acetonitrile, ethyl ether, etc. It has been found however, that the hydroxy containing material can be utilized in excess amounts, i.e. an amount greater than 400 parts of the hydroxy-containing material per part of phosphorous halogen compound, and up to 15% by weight of the equilibration mixture to also serve as the solvent. When utilizing an excess amount of hydroxy-containing material, the equilibration catalyst can be formed in situ, by adding the phosphorous halogen compound to the mixture of the organopolysiloxane and hydroxy-containing material.

If the equilibration catalyst is utilized as a premix, it can be post-heated upon contacting the phosphorous halogen compound and hydroxy-containing material for periods of from 0.1 hour or less at temperatures of from −10° C. to 100° C. The mixture of organopolysiloxane and equilibration catalyst along with a solvent if employed, can be heated to temperatures in the range of 20° C. to 170° C., to effect equilibration. The final product can then be stripped of volatiles, solvent, etc. in accordance with conventional procedures and recovered.

The process of the present invention provides for the production of a variety of polymers and copolymers including fluids and gums as shown in Formula 1 which can be modified by the incorporation of various ingredients such as thickeners to form greases, fillers to form elastomers, etc. The products produced in accordance with the present invention have all the desirable properties normally possessed by conventional organopolysiloxane compositions.

In order that those skilled in the art will be better able to practice the invention, the following examples are given by way of illustration and not by way of limitation. All parts are by weight.

EXAMPLE 1

A carboxyethyl hydrolyzate was made by hydrolyzing methylcyanoethyldichlorosilane in concentrated hydrochloric acid, where the methylcyanoethyldichlorosilane was utilized in a proportion of 1 part of methylcyanoethyldichlorosilane per 3 parts of concentrated hydrochloric acid. The mixture was refluxed for about 70 hours, and the carboxyethyl hydrolyzate was separated from the acid layer and washed with a saturated solution of sodium chloride and water.

Mixtures of the above carboxyethylmethyl hydrolyzate and octamethylcyclotetrasiloxane were made having 1% and 5% by weight of carboxyethyl methyl hydrolyzate based on the total organopolysiloxane of the mixture. Phosphorous-oxychloride was added to each of these mixtures at a proportion of 0.5% by weight, based on the weight of the organopolysiloxane. Tertiary butyl alcohol was then added to one of the mixtures at a proportion of 4% by weight and to the other mixture at 8% by weight. An equilibration mixture of octamethylcyclotetrasiloxane and 1% by weight of a mixture of carboxyethylmethyl hydrolyzate was also prepared which contained 1% by weight of phenoxy phosphoryl chloride. A mixture was also made with 0.5% by weight of phosphorous-oxychloride which was free of tertiary butyl alcohol having 1% by weight of the carboxyethylmethyl hydrolyzate.

The various mixtures containing the carboxy hydrolyzate were heated at temperatures between 100° C. to 150° C., to determine the effectiveness of the equilibration catalyst of the present invention resulting from the reaction of tertiary butyl alcohol and phosphorous-oxychloride as compared to the employment of 0.5% by weight of phosphorous-oxychloride alone and 1% by weight of phenoxy phosphoryl chloride which is utilized in the aforementioned Sprung patent. In Table I below the results of the equilibration are shown where "P" in the table under "Catalyst" represents phosphorous-oxychloride and "OH" represents "Tertiary Butyl Alcohol."

Table I
IN SITU CATALYST (t-BuOH-POCl₃)

| Catalyst, Wgt. Percent Based on Siloxane | | Equilibration of Siloxane | | | Product in Centipoises (25° C.) |
|---|---|---|---|---|---|
| P | OH | Percent Carboxy | ° C. | Time (Hr.) | |
| 0.5 | 0 | 1 | 150 | 21 | No polymerization. |
| 0.5 | 4 | 1 | 100 | 12½ | Copolymer, 16×10⁵. |
| 0.5 | 4 | 5 | 125 | 2 | Viscous copolymer. |
| 0.5 | 8 | 1 | 150 | 6 | Copolymer, 12×10⁵. |
| C₆H₅OPOCl₂ | | 1 | 150 | 20 | No polymerization. |

EXAMPLE 2

An evaluation of the effectiveness of the equilibration catalyst prepared in accordance with the practice of the present invention from phosphorous-oxychloride and tert.-butyl alcohol in the form of a "premix" was made by adding it at varying concentrations to organopolysiloxane. The equilibration catalyst was prepared by mixing together phosphorous-oxychloride and tert.-butyl alcohol and heating the mixture for a predetermined period of time at a particular temperature range. The weight proportion of phosphorous-oxychloride to tert.-butyl alcohol utilized during the preparation of the catalyst ranged from about 1 part of phosphorous-oxychloride to about 8 parts of tert.-butyl alcohol to a mixture of about 4¼ parts of phosphorous-oxychloride to 1 part of tert.-butyl alcohol. The various mixtures were heated for a period of 3 minutes to as long as 45 minutes at temperatures between about 60° C. to as high as 100 degrees centigrade. The amount of catalyst utilized to equilibrate the organopolysiloxane varied between .2% by weight to as high as 5% by weight.

In Table II below the results obtained with the catalyst at concentrations of from 0.46 to 5% by weight based on the organopolysiloxane as compared to 5% by weight of phosphorous-oxychloride and phenoxyphosphonyl chloride, where "Cat." is catalyst in percent by weight, and P and OH are as defined above.

Table II
PREMIX CATALYST (t-BuOH-POCl₃)

| Catalyst Prep. | | | Equilibration of Siloxane | | | | Product Centipoises (25° C.) |
|---|---|---|---|---|---|---|---|
| P/OH, Ratio by Wt. | ° C. | Time (Hr.) | Percent Cat. | Percent Carboxy | ° C. | Time (Hr.) | |
| 0.12 | 60 | 0.25 | 5 | 1 | 150 | 6 | Copolymer, 18×10⁵. |
| 0.6 | 81 | 0.2 | 5 | 1 | 150 | 6 | Copolymer, 20×10⁵. |
| 2.0 | 90 | 0.05 | 0.6 | 1 | 150 | 6 | Copolymer, 20×10⁵. |
| 2.0 | 66–100 | 0.5 | 0.46 | 0 | 150 | 14 | Copolymer, 10×10⁵. |
| POCl₃ | | | 5 | 1 | | | No copolymer formed. |
| C₆H₅OPOCl₂ | | | 5 | 1 | | | Do. |

EXAMPLE 3

Mixtures of isopropyl alcohol and phosphorous-oxychloride were utilized to equilibrate organopolysiloxane at a proportion of 0.3% by weight of mixture based on the weight of an organopolysiloxane which consisted of a mixture of octamethylcyclotetrasiloxane and 1% by weight of the mixture of carboxyethyl hydrolyzate of Example 1. The equilibration catalyst was formed in situ and also utilized in the form of a premix. The results obtained are shown in Table III, where P and OH are as defined above.

Table III
CATALYST (i-PrOH-POCl₃)

| Catalyst Prep. | | | | Equilibration | | Product Centipoises at 25° C. |
|---|---|---|---|---|---|---|
| Premix—P/OH, Ratio by Wt. | ° C. | Time (Hr.) | In Situ—P/OH, Ratio by Wt. | Temp. ° C. | Time (Hr.) | |
| ---------- | ------- | --- | 0.12 | 150 | 20 | Copolymer 10×10⁵. |
| 2.0 | 61–74 | 0.5 | ---------- | 135 | 22 | Viscous copolymer. |
| 2.0 | 115 | 1 | ---------- | 70 | 19 | Copolymer. |

EXAMPLE 4

A variety of hydroxy-containing material included within the scope of the invention were respectively mixed with an equal amount by weight of phosphorous oxychloride to form the equilibration catalysts of the invention in the form of premixes. The premixes were utilized to equilibrate octamethylcyclotetrasiloxane at a concentration of 1% by weight thereof. The various mixtures were heated to a temperature between 20° C. to 170° C. for a period of up to 72 hours, or until a product such as a gum was obtained. Certain of the hydroxy-containing materials were also utilized at a concentration of 1% by weight of the equilibration mixture in the absence of phosphorous-oxychloride. The phosphorous-oxychloride was also utilized at 1% by weight thereof in the absence of hydroxy-containing material. The results obtained from heating the various mixtures are shown below in Table IV, where "OH" signifies the hydroxy-containing material.

Table IV

| OH | POCl₃ | Product |
|---|---|---|
| $CH_3OPO(OH)_2$ | Yes | Gum. |
| $C_4H_9OPO(OH)_2$ | Yes | Gum. |
| $[CH_3OPO(OH)]_2$ | Yes | Gum. |
| $C_6H_5OP(OH)_2$ | Yes | Gum. |
| $CH_3COOH$ | Yes | Gum. |
| $HCOOH$ | Yes | Gum. |
| $H_3PO_4$ | Yes | Gum. |
| $CH_3OPO(OH)_2$ | No | No polymer formed. |
| $C_4H_9OPO(OH)_2$ | No | Do. |
| $[CH_3OPO(OH)]_2O$ | No | Do. |
| No | Yes | Do. |

EXAMPLE 5

An organopolysiloxane gum is made in accordance with the procedure shown in Example 1 by equilibrating octamethylcyclotetrasiloxane with an equilibration catalyst formed in situ. The equilibration catalyst is prepared by adding, with stirring, 0.5 part of phosphorous-oxychloride to a mixture of 4.95 parts of tertiary butyl alcohol and 100 parts of octamethylcyclotetrasiloxane and heating the mixture for a period of about 14 hours at 100° C. The tertiary butyl alcohol is removed by heating the resulting product to 150° C. with a nitrogen steam. There is obtained a polymer having a viscosity of about one million centipoises at 25° C.

Without further treatment of the polymer such as washing and decatalyzing, it is milled with about 40 parts of fumed silica and about 2 parts of benzoyl peroxide. The resulting composition is cured by heating it for 16 hours at about 250° C. There is obtained an elastomer having a hardness of 79 (Shore A), a tensile of 690 (p.s.i.) and an elongation of 80 (percent).

The results obtained as shown in the above examples and tables clearly demonstrate the valuable utility of the equilibration catalyst of the present invention. Those skilled in the art would know that the equilibration catalyst produced in accordance with the present invention provides for the rearrangement and intercondensation of organosiloxy units and carboxyalkyl siloxy units resulting in the production of a variety of valuable organopolysiloxane polymers and copolymers.

While the foregoing examples have of necessity been limited to only a few of the very many variables within the scope of the present invention, it should be understood that the present invention covers a much broader class of organopolysiloxane polymers and copolymers composed of the units shown in Formulae 2 and 3 which can be made by the employment of the equilibration catalyst in accordance with the practice of the present invention.

What I claim as new and desire to secure by Letters Patent of the United States is:

1. A method for effecting the intercondensation and rearrangement of siloxy units having carboxyalkyl radicals attached to silicon by carbon-silicon linkages to provide for the formation of carboxyalkylorganopolysiloxane having a ratio of the sum of carboxyalkyl radicals and organo radicals per silicon atom of from 1.5 to 3, and a viscosity up to $10^8$ centipoises at 25° C, which comprises heating at a temperature between 20° to 170° C, a mixture of carboxyalkylpolysiloxane and 0.01% to 10% by weight thereof of an equilibration catalyst, where said carboxyalkylpolysiloxane is selected from,
   (a) carboxyalkylpolysiloxane consisting essentially of chemically combined siloxy units having carboxyalkyl radicals attached to silicon, and
   (b) a mixture of said carboxyalkylpolysiloxane and organosiloxane consisting essentially of chemically combined siloxy units having organo radicals attached to silicon, selected from the group consisting of monovalent hydrocarbon radicals, halogenated monovalent hydrocarbon radicals and cyanoalkyl radicals, and said equilibration catalyst is the product of reaction at a temperature in the range of from −10° C to 100° C of 0.1 to 400 parts of a hydroxy containing material, per part of a phosphorous halogen compound selected from the class consisting of phosphorous pentahalides and phosphorous oxy halides, where said hydroxy containing material is selected from the class consisting of secondary aliphatic alcohols, tertiary aliphatic alcohols, aliphatic carboxylic acids, and acids of phosphorous having hydoxy radicals attached to phosphorous.

2. A method in accordance with claim 1, where the carboxyalkylpolysiloxane is carboxyethylpolysiloxane.

3. The method of claim 1, where the equilibration catalyst is the product of reaction of a phosphorous oxygen halide and a tertiary aliphatic alcohol.

4. The method of claim 1, where the equilibration catalyst is the product of a phosphorous oxygen halide and a secondary aliphatic alcohol.

5. The method of claim 1, where the equilibration catalyst is utilized in the form of a premix.

6. The method of claim 3, where the tertiary aliphatic alcohol is tertiary butyl alcohol.

7. The method of claim 3, where the phosphorous oxygen halide is phosphorous-oxychloride and the tertiary aliphatic alcohol is tertiary butyl alcohol.

8. The method of claim 4, where the secondary aliphatic alcohol is isopropyl alcohol.

9. The method of claim 8, where the phosphorous oxygen halide is phosphorous-oxychloride.

References Cited by the Examiner
UNITED STATES PATENTS

| | | | |
|---|---|---|---|
| 2,472,629 | 6/49 | Sprung | 260—46.5 |
| 2,883,366 | 4/59 | Kantor et al. | 260—46.5 |

MURRAY TILLMAN, *Primary Examiner.*

WILLIAM H. SHORT, *Examiner.*